United States Patent [19]

Saitoh et al.

[11] Patent Number: 4,554,583
[45] Date of Patent: Nov. 19, 1985

[54] SHADING CORRECTION DEVICE

[75] Inventors: Hiroyuki Saitoh; Masami Kurata, both of Kanagawa, Japan

[73] Assignee: Fuji Xerox Co., Ltd., Tokyo, Japan

[21] Appl. No.: 483,310

[22] Filed: Apr. 8, 1983

[30] Foreign Application Priority Data

Apr. 9, 1982 [JP] Japan ................................. 57-58028

[51] Int. Cl.$^4$ ............................................. H04N 5/14
[52] U.S. Cl. .................................... 358/163; 358/284
[58] Field of Search ...................... 358/163, 282, 284; 332/50, 53, 54, 63

[56] References Cited

FOREIGN PATENT DOCUMENTS

| 20613 | 2/1979 | Japan | .................................. 358/163 |
| 79567 | 6/1980 | Japan | .................................. 358/163 |
| 162669 | 12/1980 | Japan | .................................. 358/163 |

Primary Examiner—Tommy P. Chin
Assistant Examiner—Michael D. Parker
Attorney, Agent, or Firm—Sughrue, Mion, Zinn, Macpeak & Seas

[57] ABSTRACT

A method and apparatus for correcting the photoelectric converter of a document reading unit for non-linearities produced by the optics of the system. A test document having no image data thereon is scanned to produce a shade correction signal which is subjected to A/D conversion and stored in a memory. In binary-encoding the picture data of the original, a switch is operated according to the data stored in the memory so as to change a threshold level for the picture signal, whereby digital picture data whose shading has been corrected is obtained. In the case where the picture data of the original are represented by an analog signal, the picture data are also subjected to A/D conversion, and division is carried out with the data stored in the memory being employed as dividends. From the results of such a division, corrected multi-level picture data is obtained.

9 Claims, 19 Drawing Figures

SHADING CORRECTION DEVICE

BACKGROUND OF THE INVENTION

This invention relates to a shading correcting device which is used in a reading device having a solid-state image pickup element.

Solid-state image pickup elements are used extensively in reading and recording devices such as facsimile devices or other copying machines. The image pickup element reads the picture datum on an original and converts the read information into a series of electrical signals.

FIG. 1 shows one example of such a reading device. An original 2 is placed on a transparent platen 1 in such a manner that the surface of the original to be read faces downwardly. A fluorescent lamp 3 is provided below the platen 1 in such a manner that light therefrom is extended in the main scanning direction of the original 2. Light from the fluorescent lamp 3 is applied to the original 2, and light reflected from the original 2 is applied through a lens 4 to a solid-state image pickup element 5 which forms the optical image. The image pickup element is, for instance, a one-dimensional image pickup element which utilizes a CCD. As the original 2 is moved in the auxiliary scanning direction, the picture datum is read in a raster scan pattern.

With the above-described recording device, even when an original is uniform in density over a line (as in the case of a substantially blank original), the photo-electric conversion output of the solid-state image pickup element 5 is not uniform. One reason for this phenomena is that the light source is not uniform in luminance distribution. As shown in FIG. 2, when a fluorescent lamp 3 is used as the light source, the rays 6 therefrom are concentrated at the center of a reading line. Accordingly, the illuminance is highest at the center of the original, and it decreases towards either end of the original. Thus, the photo-electric conversion output is not uniform. Other reasons for the non-uniform photo-electric output are that the quantity of light at the periphery of the lens 4 is small due to the cosine biquadrate rule, and the solid-state image pickup element 5 is not uniform in sensitivity.

If the photo-electric conversion output of the solid-state image pickup element 5 is not uniform, a subsequent signal processing operation such as a binary-encoding of the analog picture signals is adversely affected, resulting in a reduction in the quality of picture. This phenomena will be described in greater detail with reference to FIG. 3. In the description to follow, it is assumed that an original's reading line has picture data 7 (black-and-white data) as shown in FIG. 3A. In this case, the solid-state image pickup element provides a non-uniform photo-electric conversion output 8 as shown in FIG. 3B. The output 8 is binary-encoded by comparison with a preset threshold level $l_1$. In this case, in the central portion of a line, a signal level corresponding to black picture data (hereinafter referred to as a "black level", when applicable) may be binary-encoded erroneously as white picture data. In addition, in the vicinity of each end of a given picture line, a signal level corresponding to white picture data (hereinafter referred to as a "white level", when applicable) may be binary-encoded erroneously as black picture data. Accordingly, when a threshold level $l_1$ is provided as shown in FIG. 3B, the generated binary-encoded picture signal 9 is considerably deteriorated when compared to the original picture data.

In order to prevent the picture data from being deteriorated in the binary-encoding operation, a shading correcting device is known in the art in which a threshold level is set by an A/D converter and a D/A converter. With reference to FIG. 4A, a white (blank) line is first read by the solid-state image pickup element so that a photo-electric conversion output (a shading waveform) 11 over a line is obtained. Then, the output 11 is converted into digital data by the A/D converter, and the digital data is stored in a memory. Thereafter (i.e., when the picture signals are actually read), the digital datum are converted into analog datum by the D/A converter. According to the analog datum, a threshold level $l_2$ similar to the shading waveform 11 is set as shown in FIG. 4B, so that the picture signal 12 is subjected to binary-encoding. Accordingly, the white and black levels of the picture data are binary-encoded correctly, as a result of which a digital picture signal 13 high in quality can be obtained as shown in FIG. 4C.

The above-described conventional shading correcting device is disadvantageous in that it necessitates the use of a D/A converter for converting digital signals which are obtained through A/D conversion into analog signals.

SUMMARY OF THE INVENTION

In view of the foregoing, an object of this invention is to provide a shading correcting device which can satisfactorily correct shading without using a D/A converter.

The foregoing and other objects of the invention are achieved by providing a waveform for shading correction which is obtained during a preliminary scanning of an original and is subjected to A/D conversion and stored in a memory. In binary-encoding the picture data of the original, a switch is operated according to the data stored in the memory so as to change a threshold level for the picture signal, whereby digital picture data whose shading has been corrected is obtained. In the case where the picture datum on the original is represented by an analog data (multilevel), the picture datum is also subjected to A/D conversion, and division is carried out with the datum stored in the memory being employed as dividends. From the results of such a division, corrected multilevel picture data is obtained.

BRIEF DESCRIPTION OF THE DRAWINGS

The structure and operation of the invention will become more apparent upon a detailed description of the preferred embodiments thereof. In the description to follow, reference will be made to the accompanying drawings, in which.

DETAILED DESCRIPTION OF THE PREFERRED EMBODIMENTS

Figure 1:
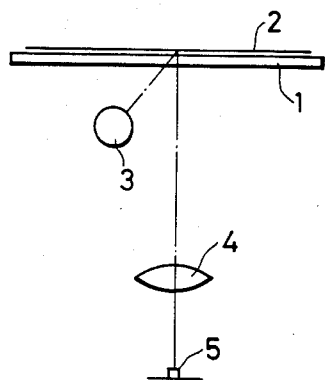
FIG. 1 is an explanatory diagram outlining the general arrangement of a reading device.
Figure 2:
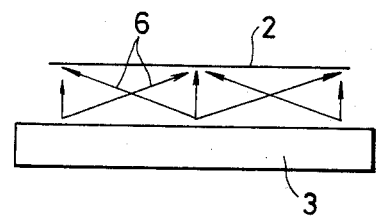
FIG. 2 is an explanatory diagram for showing the principle that, when a fluorescent lamp is employed as the light source of the reading device, the surface of an original is not uniform in luminance.
Figure 3A:
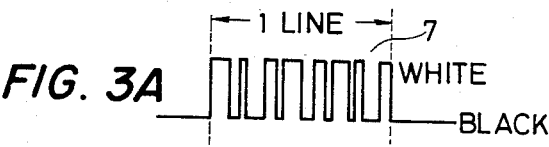
FIGS. 3A–3C is a diagram showing various waveforms for a description of the binary-encoding operation with a non-uniform luminance as shown in FIG. 2.
Figure 3B:
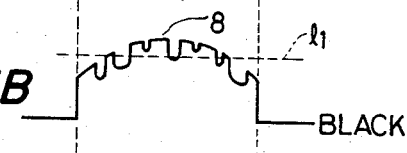
Figure 3C:
Figure 4A:
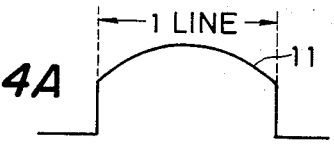
FIGS. 4A–4C are diagrams showing the various waveforms of the waveform processing operation in a shading correcting device of the prior art.
Figure 4B:
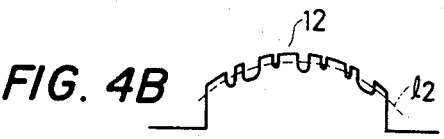
Figure 4C:
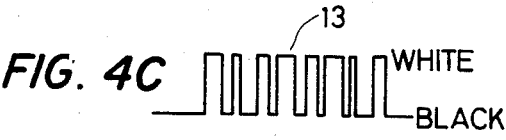
Figure 5:
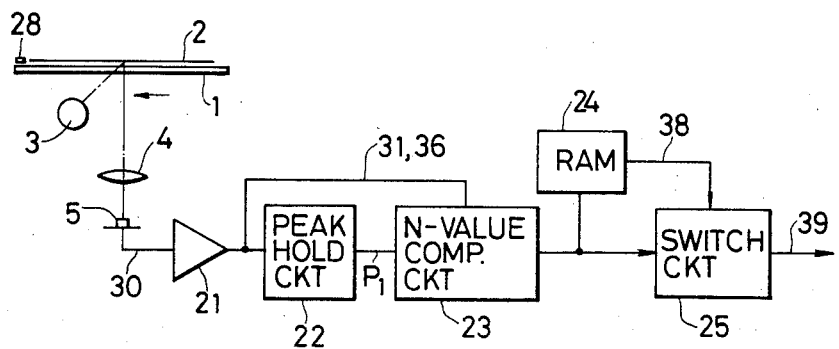
FIG. 5 is a block diagram showing a reading device according to a first embodiment of the present invention.

FIG. 5 shows a first embodiment of a shading correcting device according to the invention. In the device, an amplifier 21 amplifies picture datum which has been subjected to photo-electric conversion by a solid-state image pickup element 5. A peak hold circuit 22 for holding the peak value of the picture datum and an n-value comparison circuit 23 for subjecting the picture datum to an n-value comparison by referring to the peak value held in peak hold circuit 22 are both provided on the output side of amplifier 21. A digital picture signal (shading correcting waveform) in a preliminary scanning step prior to an original scanning step is stored in a random access memory (RAM) 24. In a step of scanning picture data, a switching circuit 25 is controlled by the contents of the random access memory 24 so that the threshold level is changed and corrected digital picture datum is produced thereby.

The operation of the above-described circuit will now be described in more detail. An original 2 is placed on a platen 1 which can reciprocate freely. Immediately before the original is to be scanned, the platen 1 is held at its start position. Under this condition, a correcting board 28 which is arranged at the left end of the original 2 in FIG. 5 is on the optical axis of a lens 4. When the scanning operation for reading the original is started, the platen 1 is moved in the direction of the arrow (or in the auxiliary scanning direction) so that the solid-state image pickup element 5 begins to output picture datum.

Figure 6A:
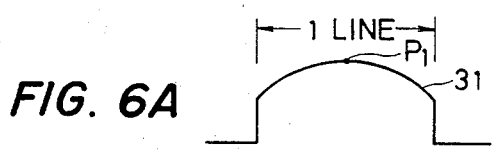
FIGS. 6A–6F are diagrams showing the various waveforms of a waveform processing operation in the first embodiment of the invention.

Picture datum 30 are produced by scanning the first several lines of the correcting board 28. The correcting board 28 is an elongated board which is equal in length to the scanning width of the original, and its lower surface (or a reading surface) is coated with white paint which is equal in brightness to the white areas of the original. By scanning a white (blank) line, an intensity distribution (i.e., the datum 30) will be produced which corresponds to the shading waveform inherent in the system optics, as shown in FIG. 6A. The picture datum 30 are processed through the amplifier 21, which outputs amplified picture datum 31. The picture datum 31 are then applied to the peak hold circuit 22 such that the peak value thereof is detected and held. FIG. 6A shows the shading waveform provided when the correcting board 28 is read, having a peak value $P_1$ which is detected by hold circuit 22. The peak value $P_1$ is supplied to the n-value comparison circuit 23.

Figure 7:
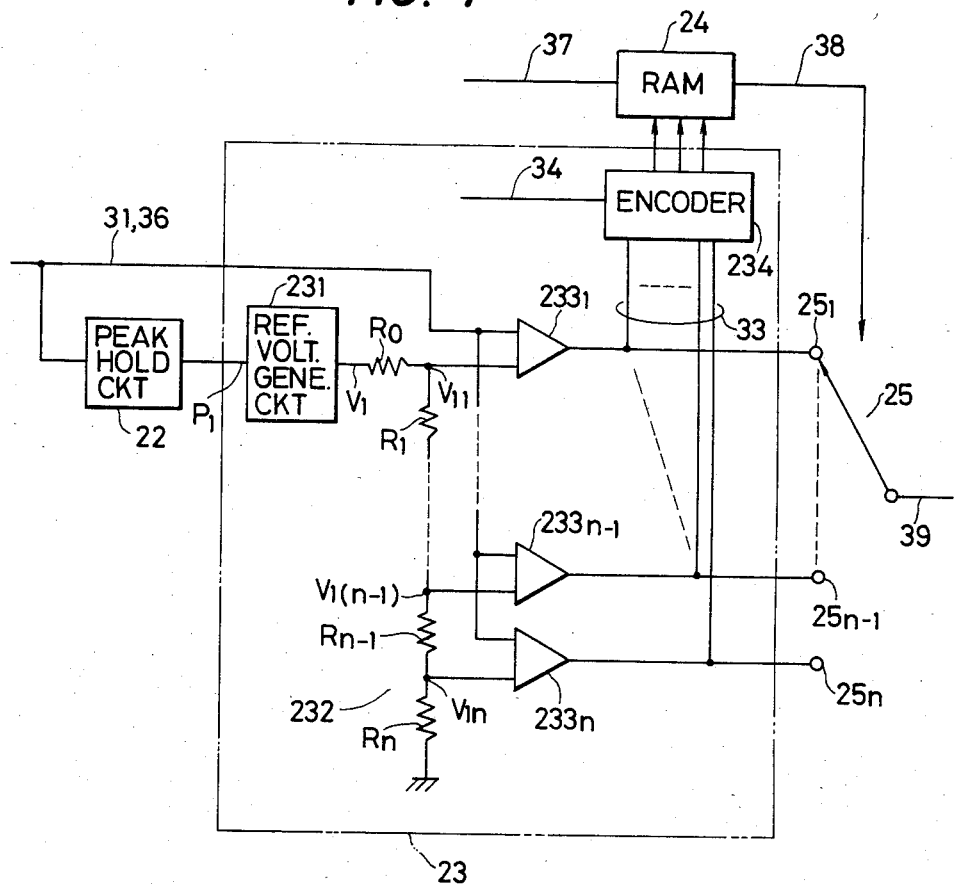
FIG. 7 is a schematic diagram of the n-value comparison circuit and the switching circuit of the first embodiment of the invention.

FIG. 7 shows the n-value comparison circuit 23 and the switching circuit 25 in greater detail. The peak value $P_1$ is applied to a reference voltage generating circuit 231, where a reference voltage $V_1$ is maintained until one original has been scanned. The reference voltage $V_1$ corresponds to the peak value $P_1$.

The reference voltage $V_1$ is applied to one end of a series circuit 232 of (n+1) resistors $R_O$ through $R_n$, the other end of which is grounded. N different comparison reference voltages $V_{11}$ through $V_{1n}$, are provided by the series circuit 232 at the connecting points of the resistors $R_O$ through $R_n$, respectively. The resistor $R_O$ is provided in order to make the comparison reference voltage $V_{11}$ slightly lower than the reference voltage $V_1$ for the purpose of binary-encoding. The resistors $R_O$ through $R_n$ may be equal to or different from one another in resistance. The comparison reference voltages $V_{11}$ through $V_{1n}$ thus provided are applied to the reference voltage input terminals of comparators $233_1$ through $233_n$, respectively.

Figure 6B:
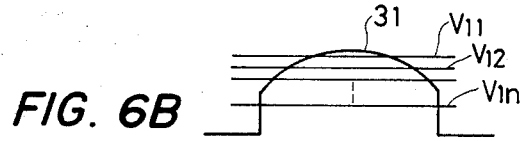
Figure 6C:
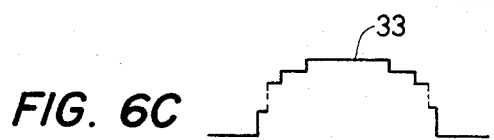

After the peak value is detected by the peak hold circuit 22, the amplified picture datum 31 produced by the scanning of one line of correcting board 28 are supplied to the remaining input terminals of the comparators $233_1$ through $233_n$. In the comparators $233_1$ through $233_n$, the analog picture data 31 are compared to the comparison reference voltages $V_{11}$ through $V_{1n}$, as shown in FIG. 6B, and the results of the comparison are supplied as a correction signal 33 (as shown in FIG. 6C) to an encoder 234. The generated correction signal 33 is the binary-encoded version of the shading waveform.

The encoder 234 receives a clock signal 34 and samples the correction signal 33 for one line with a predetermined period. The signals (33) thus sampled are encoded into n different codes according to their levels. The encoded signals are then written into respective storage areas of the random access memory (or RAM) 24. Thus, the original has been preliminarily scanned for shading correction.

Figure 6D:
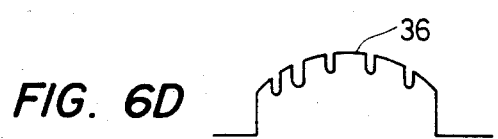

When the platen 1 is further moved in the direction of the arrow and scanning of the original begins, the amplified analog picture datum 36 (as shown in FIG. 6D) which are outputted by the amplifier 21 are applied to the n-value comparison circuit 23. The random access memory 24, receiving a line synchronizing signal 37 which is produced in synchronization with the production of analog picture datum 36 of each line, outputs codes 38 successively at respective positions on one line in synchronization with the synchronizing signals 37. In other words, for a given position along a scanned line of the original, the RAM 24 will output a particular output code 38.

Figure 6E:
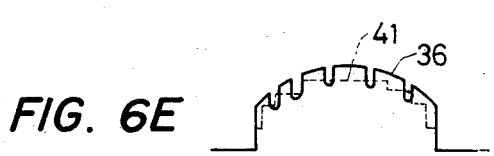
Figure 6F:
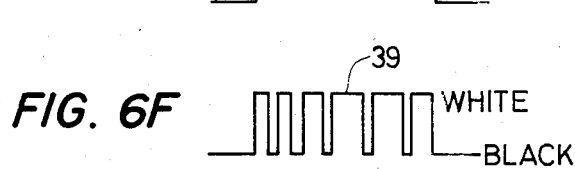

The switching circuit 25 is an electronic switch having n contacts $25_1$ through $25_n$. The switching circuit 25 receives the code 38. The armature of the switching circuit 25 is tripped according to the content of the code 38. The contacts $25_1$ through $25_n$ are connected to the outputs of the comparators $233_1$ through $233_n$, respectively. Accordingly, among the picture datum 36 binary-encoded by comparison to the reference comparison voltages $V_{11}$ through $V_{1n}$, an optimum data 39 to which shading correction has been given is outputted by the switching circuit 25. In other words, the outputted code 38 switches the switching circuit 25 to the output of one of the comparators $233_1$–$233_n$ having the threshold level corresponding to the given position of the scanned line. For example, with reference to FIG. 6E, when the synchronizing signal indicates that the midpoint of a particular scanning line is being read, the output code 38 extracted from RAM will switch the switching circuit 25 to the output of comparator 233₁, which compares the picture data 36 read at the midpoint of the scanning line to the highest reference voltage $V_{11}$. In FIG. 6E, the dotted line indicates the threshold levels selectively compared to the picture datum 36, and FIG. 6F shows the resultant digital picture data 39. Thus, it can be understood that the first embodiment of the invention produces satisfactory shading correction for each line of the original which is subjected to binary-encoding.

Figure 8:
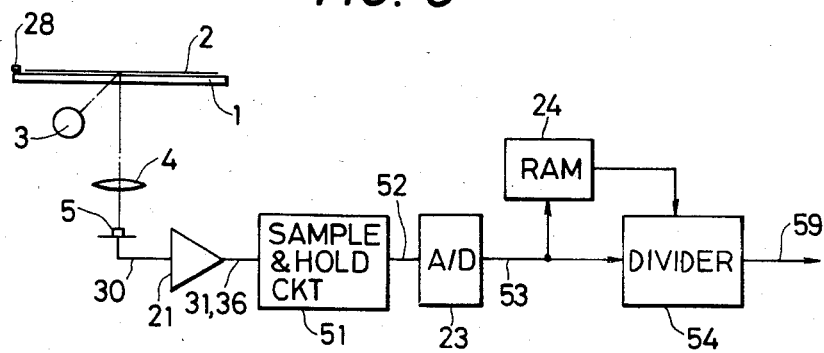
FIG. 8 is a block diagram showing the essential components of a reading device according to a second embodiment of the invention.

FIG. 8 shows a second embodiment of the shading correcting device according to the invention. In FIG. 8, those components which have been previously described with reference to FIG. 5 are designated by the same reference numerals. In the device also, the correcting board 28 is read immediately before the original (2) is scanned. The analog picture datum 31 of one line of the correcting board 28 is applied to a sample and hold circuit 51. The circuit 51 operates to sample the datum 31 with a predetermined sampling period and to temporarily hold the sampled datum. The analog signals 52 which are provided by sampling are applied to an A/D converter 23'.

Figure 9:
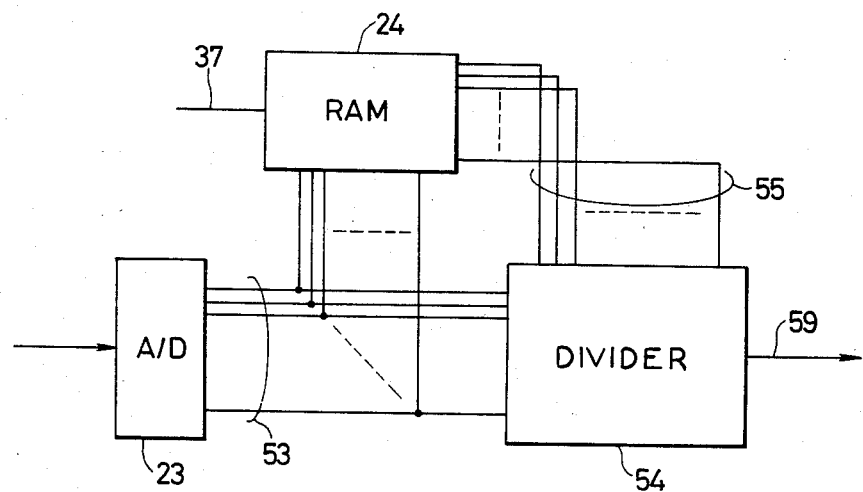
FIG. 9 is a diagram showing a portion of the second embodiment of the invention in greater detail.

The A/D converter 23' produces 8-bit binary signals as a function of the brightness levels of the analog signals 52. The binary signals are outputted on first signal lines 53 as shown in FIG. 9. The binary signals supplied to signal lines 53 are similar in nature to the outputs of the encoder 234 in the first embodiment of the invention. That is, the signal processing which is carried out from the start of the reading operation until this step may be the same as that of the first embodiment as long as the outputs of the encoder 234 are digital data corresponding to the analog levels of the picture data 31.

The first signal lines 53 branch into two groups of signal lines, so that the binary signals outputted by the A/D converter 23' are applied to both the random access memory 24 and a divider 54. In the preliminary scanning step, the binary signals are written in the random access memory 24. Thus, the step of preparation for shading correction has been accomplished.

When the platen is further moved to start scanning the original, the analog picture datum 36 which are outputted by the amplifier at this time are supplied to the sample and hold circuit 51, where they are sampled with a period corresponding to the main scanning density. The analog signals 52 obtained through the sampling are converted into 8-bit binary signals by the A/D converter and the binary signals are supplied to the first signal lines 53.

In this operation, the random access memory 24 reads out the binary signals in synchronization with the line synchronizing signal 37. The binary signals are supplied through second signal lines 55 to the divider 54. In the divider 54, the 8-bit binary signal supplied through the second signal lines 55 is divided into the 8-bit binary signal supplied through the first signal lines 53.

Figure 10:
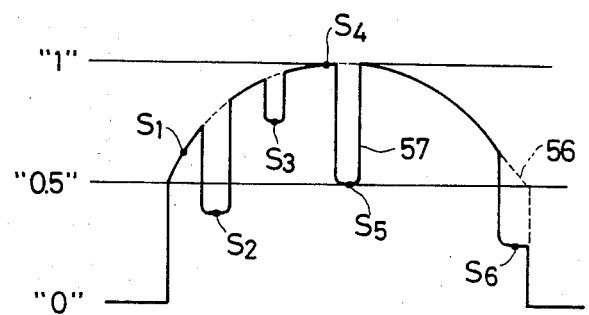
FIG. 10 is a waveform diagram showing one example of the shading correction produced by the second embodiment of the invention.

FIG. 10 is a diagram for a description of the shading correction according to the second embodiment of the invention. In FIG. 10, the curve 56 indicated by the dotted line is the analog data of the 8-bit binary signals supplied over the second signal lines 55 corresponding to a waveform for shading correction. Further in FIG. 10, the curve 57 indicated by the solid line is the analog data of the 8-bit binary signals supplied over the first signal lines 53 corresponding to the signal levels of the picture data 36 of the original 2. It is assumed that the peak level (white) of the curve 56 is "1", and the zero level (black) is "0". With respect to optional points $S_1$ through $S_6$ on the curve 57, division will be carried out by the divider 54.

For the points $S_1$ and $S_4$ which are on the curve 56, the result of division is "1". More specifically, with respect to the point $S_1$, $0.625/0.625=1$, and with respect to the points $S_4$ $b$ $1/1=1$. Thus, it can be detected from the results of division that, at such points, the picture data are "whit".

The results of division for the other points are as follows:
$S_2$; $0.375/0.825=0.4545$
$S_3$; $0.575/0.95=0.6053$
$S_5$; $0.5/1=0.5$
$S_6$; $0.25/0.55=0.4545$ It can be understood from the foregoing ratios of the dividends to the divisors that at these points the halftones of the original are represented as numerical values.

The divider 54 outputs the results of the division as digital picture data 59 according to the required degree of gradation. For instance, when the gradation required is eight ($8=2^3$) steps, the three highest bits of the result of division are outputted, and when the gradation required is sixteen ($16=2^4$), the four highest bits are outputted. It goes without saying that gradation in more steps can be indicated. The above-described operation is carried out for every line, and picture data is read with satisfactory shading correction.

As is apparent from the above description, the device according to the invention can read picture data with sufficiently high accuracy without using a D/A converter and is simple in circuitry and high in reliability.

In the above-described embodiments, the shading correcting data is obtained by scanning the correcting board; however, the same data can be obtained, for instance by scanning a white end portion of the original.

We claim:

1. In a reading device for raster scanning an original disposed on a platen which is illuminated by a light source, a conversion correcting device comprising:
    an A/D converter for converting a first analog picture signal representing a reference line scanned by said reading device into a first reference digital picture signal;
    memory means for storing said first digital picture signal;
    said A/D converter including a plurality of comparison means for comparing an analog picture signal applied thereto to a plurality of threshold levels, and a threshold circuit means responsive to a peak value of said first analog picture signal for generating said plurality of threshold levels;
    means for applying a second analog picture signal, produced during the scanning of said original, and said threshold levels to said plurality of comparison means; and
    switching means for switching between said plurality of comparison means, said switching means receiving said first digital picture signal from said memory means in synchronism with said scanning of said original and switching between said comparison means as a function of said first digital picture signal, said switching means outputting a corrected digital picture signal.

2. The conversion correcting device as recited in claim 1, wherein said threshold circuit means comprises a peak hold circuit for detecting said peak value of said first analog picture signal, and a reference voltage generating circuit for setting said plurality of threshold levels as a function of said peak value stored in said peak hold circuit.

3. A reading unit for raster scanning an original disposed on a platen which is illuminated by a light source to produce a reflected illumination signal, said original having an image thereon which modulates said reflected illumination signal, comprising:

a photo-electric conversion unit for converting said reflected illumination signal into a plurality of electrical picture signals;

a sample-and-hold circuit for sampling said electrical signals;

analog-to-digital conversion means for converting said sampled picture signals into a plurality of digital picture signals;

memory means for storing selected ones of said digital picture signals; and divider means for dividing said digital signals by said selected digital signals stored in said memory means in synchronism with said raster scanning of said original, said divider means outputting a plurality of digital picture signals.

4. In a reading device for raster scanning an original disposed on a platen which is illuminated by a light source, a conversion correcting device comprising:

an A/D converter for converting a first analog picture signal into a first digital picture signal and converting a second analog picture signal into a second digital picture signal, said first analog picture signal being produced by scanning at least one line of a reference object disposed on said platen having a plurality of scanning lines of a first brightness level only, and said second analog picture signal being produced during the scanning of said original;

memory means for storing said first digital picture signal; and a divider circuit for dividing said second digital picture signal by said stored first digital picture signal on a line-by-line basis in synchronism with said scanning of said original, said divider circuit outputting a third digital picture signal of X bits.

5. The conversion correcting device as recited in claim 4, wherein said third digital picture signal has a required gradation degree of $2^X$ steps 6. In a reading device of the type comprising a platen upon which an original is disposed for illumination by a light source, said original being raster scanned by said light source, a light beam reflected from said original being converted into an electrical signal by an electro-optical element, a shading correcting method for producing a corrected picture signal comprising the steps of:

scanning at least one line of a test object having a constant brightness level to produce a first electrical signal;

detecting and holding a peak level of said first electrical signal;

generating a plurality of threshold levels as a function of said peak level;

comparing said plurality of generated threshold levels to said first electrical signal in a plurality of comparators to produce a first digital picture signal;

storing said first digital picture signal in a memory;

scanning said original to produce an analog picture signal;

comparing said analog picture signal to said plurality of threshold levels in said plurality of comparators;

generating a synchronization signal in synchronism with said scanning of said original;

outputting said first digital picture signal from said memory as a function of said generated synchronization signals;

selecting between said plurality of comparators as a function of said first digital picture signal to output a corrected digital picture signal.

7. In a reading of the type comprising a platen upon which an original is disposed for illumination by a light source, said original being raster scanned by said light source to produce a light beam which is converted into a electrical signal by an electro-optical element, a shading correcting method for producing a corrected picture signal comprising the steps of:

scanning at least one line of a test object having a constant brightness level to produce a first electrical signal;

sampling said first electrical signal during predetermined sampling periods;

converting said sampled first electrical signal into a first binary signal;

storing said first binary signal in a memory;

scanning said original to produce an analog picture signal;

sampling said analog picture signals during predetermined sampling periods;

converting said sampled analog picture signals into a second binary signal;

generating a synchronization signal in synchronism with said scanning of said original;

outputting said first binary signal from said memory as a function of said synchronization signal; and dividing said second binary signals by said first binary signals and outputting a product of said division as said corrected picture signal.

8. The shading correcting method of claim 6, wherein said test object comprises an end portion of said original.

9. The shading correcting method as recited in claim 7, wherein said test object comprises an end portion of said original.

* * * * *